United States Patent
Balasubramanian et al.

(10) Patent No.: US 11,049,162 B2
(45) Date of Patent: Jun. 29, 2021

(54) METHOD, MEDIUM, AND SYSTEM FOR AUTOMATED HARDWARE DEVICE REPLACEMENT

(71) Applicant: INTERNATIONAL BUSINESS MACHINES CORPORATION, Armonk, NY (US)

(72) Inventors: Swaminathan Balasubramanian, Troy, MI (US); Santosh S. Borse, Westchester, NY (US); Ravi P. Bansal, Tampa, FL (US); Radha Radha Mohan De, Howrah (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/117,210

(22) Filed: Aug. 30, 2018

(65) Prior Publication Data
US 2020/0074522 A1 Mar. 5, 2020

(51) Int. Cl.
*G06Q 30/06* (2012.01)
*G06F 16/951* (2019.01)

(52) U.S. Cl.
CPC ....... *G06Q 30/0625* (2013.01); *G06F 16/951* (2019.01); *G06Q 30/0633* (2013.01)

(58) Field of Classification Search
CPC .................................. G06Q 30/0625
See application file for complete search history.

(56) References Cited

U.S. PATENT DOCUMENTS

| | | | |
|---|---|---|---|
| 10,282,788 B1 * | 5/2019 | Jordan, II | G08B 21/0461 |
| 10,565,566 B1 * | 2/2020 | Davis | G06Q 30/0613 |
| 2010/0332525 A1 * | 12/2010 | Gildred | G06Q 30/02 707/769 |
| 2013/0214935 A1 | 8/2013 | Kim | |
| 2015/0018979 A1 | 1/2015 | Tomii | |
| 2015/0019342 A1 | 1/2015 | Gupta | |
| 2015/0033081 A1 * | 1/2015 | Bickford | G06F 11/3065 714/39 |
| 2016/0072677 A1 | 3/2016 | Gupta | |

(Continued)

OTHER PUBLICATIONS

Gadget Fix, May 10, 2015, Sunday Times [London, UK], p. 34 (Year: 2015).*

(Continued)

*Primary Examiner* — Marissa Thein
*Assistant Examiner* — Anna Mae Mitros
(74) *Attorney, Agent, or Firm* — Schmeiser, Olsen & Watts; Nicholas L. Cadmus (57) ABSTRACT

A method and system for replacing a hardware device is provided. The method includes detecting current utilization attributes of an Internet of things (IOT) device connected to a server device through a network. Recommended utilization attributes of the IOT device are retrieved and analyzed with respect to the current utilization attributes. It is determined that the current utilization attributes do not equal a threshold value associated with the recommended utilization attributes and optimal utilization attributes for replacing the IOT device are determined. A network based search for locating a replacement IOT device is executed and associated results are presented to a user. A resulting process for securing the replacement device is executed.

20 Claims, 7 Drawing Sheets

(56) References Cited

U.S. PATENT DOCUMENTS

| | | |
|---|---|---|
| 2016/0127144 A1 | 5/2016 | Takahashi |
| 2016/0371762 A1 | 12/2016 | Fergis |
| 2017/0300955 A1 | 10/2017 | White |
| 2018/0354147 A1* | 12/2018 | Goldfarb ............. B26B 21/4056 |
| 2019/0034858 A1* | 1/2019 | Ferguson ........... G07C 9/00896 |
| 2019/0118767 A1* | 4/2019 | Britt ........................ H04L 63/00 |

OTHER PUBLICATIONS

Stojkoska, B. L. R., & Trivodaliev, K. V. (2017). A review of Internet of Things for smart home: Challenges and solutions. Journal of Cleaner Production, 140, pp. 1454-1464.

* cited by examiner

METHOD, MEDIUM, AND SYSTEM FOR AUTOMATED HARDWARE DEVICE REPLACEMENT

FIELD

The present invention relates generally to a method for automatically tracking hardware device utilization and in particular to a method and associated system for improving hardware utilization technology associated with detecting Internet of Things (IOT) utilization attributes and executing a process for replacing an IOT device based on the detected utilization attributes.

BACKGROUND

Accurately determining device characteristics typically includes an inaccurate process with little flexibility. Determining solutions with respect to enabling device usage efficiency may include a complicated process that may be time consuming and require a large amount of resources. Accordingly, there exists a need in the art to overcome at least some of the deficiencies and limitations described herein above.

SUMMARY

A first aspect of the invention provides a device replacement improvement method comprising: detecting, by a processor of a server device, current utilization characteristics of an Internet of things (IOT) device connected to the server device through a network; retrieving from a first database, by the processor, recommended utilization characteristics of the IOT device; analyzing, by the processor, the current utilization characteristics with respect to the recommended utilization characteristics; determining, by the processor based on results of the analyzing, that the current utilization characteristics do not equal a threshold value associated with the recommended utilization characteristics; determining in response to the determining that the current utilization characteristics do not equal the threshold value, by the processor based on analysis of the current utilization characteristics with respect to predicted utilization characteristics of the IOT device, optimal utilization characteristics for replacing the IOT device; executing, by the processor, a network based search for locating a replacement IOT device; presenting to a user, by the processor via a GUI, results of the network based search; and executing, by the processor, a process for securing the replacement device.

A second aspect of the invention provides a computer program product, comprising a computer readable hardware storage device storing a computer readable program code, the computer readable program code comprising an algorithm that when executed by a processor of a server device implements a device replacement improvement method, the method comprising: detecting, by the processor, current utilization characteristics of an Internet of things (IOT) device connected to the server device through a network; retrieving from a first database, by the processor, recommended utilization characteristics of the IOT device; analyzing, by the processor, the current utilization characteristics with respect to the recommended utilization characteristics; determining, by the processor based on results of the analyzing, that the current utilization characteristics do not equal a threshold value associated with the recommended utilization characteristics; determining in response to the determining that the current utilization characteristics do not equal the threshold value, by the processor based on analysis of the current utilization characteristics with respect to predicted utilization characteristics of the IOT device, optimal utilization characteristics for replacing the IOT device; executing, by the processor, a network based search for locating a replacement IOT device; presenting to a user, by the processor via a GUI, results of the network based search; and executing, by the processor, a process for securing the replacement device.

A third aspect of the invention provides a server device comprising a processor coupled to a computer-readable memory unit, the memory unit comprising instructions that when executed by the processor executes a device replacement improvement method comprising: detecting, by the processor, current utilization characteristics of an Internet of things (IOT) device connected to the server device through a network; retrieving from a first database, by the processor, recommended utilization characteristics of the IOT device; analyzing, by the processor, the current utilization characteristics with respect to the recommended utilization characteristics; determining, by the processor based on results of the analyzing, that the current utilization characteristics do not equal a threshold value associated with the recommended utilization characteristics; determining in response to the determining that the current utilization characteristics do not equal the threshold value, by the processor based on analysis of the current utilization characteristics with respect to predicted utilization characteristics of the IOT device, optimal utilization characteristics for replacing the IOT device; executing, by the processor, a network based search for locating a replacement IOT device; presenting to a user, by the processor via a GUI, results of the network based search; and executing, by the processor, a process for securing the replacement device.

The present invention advantageously provides a simple method and associated system capable of accurately determining device characteristics.

DETAILED DESCRIPTION

Figure 1:
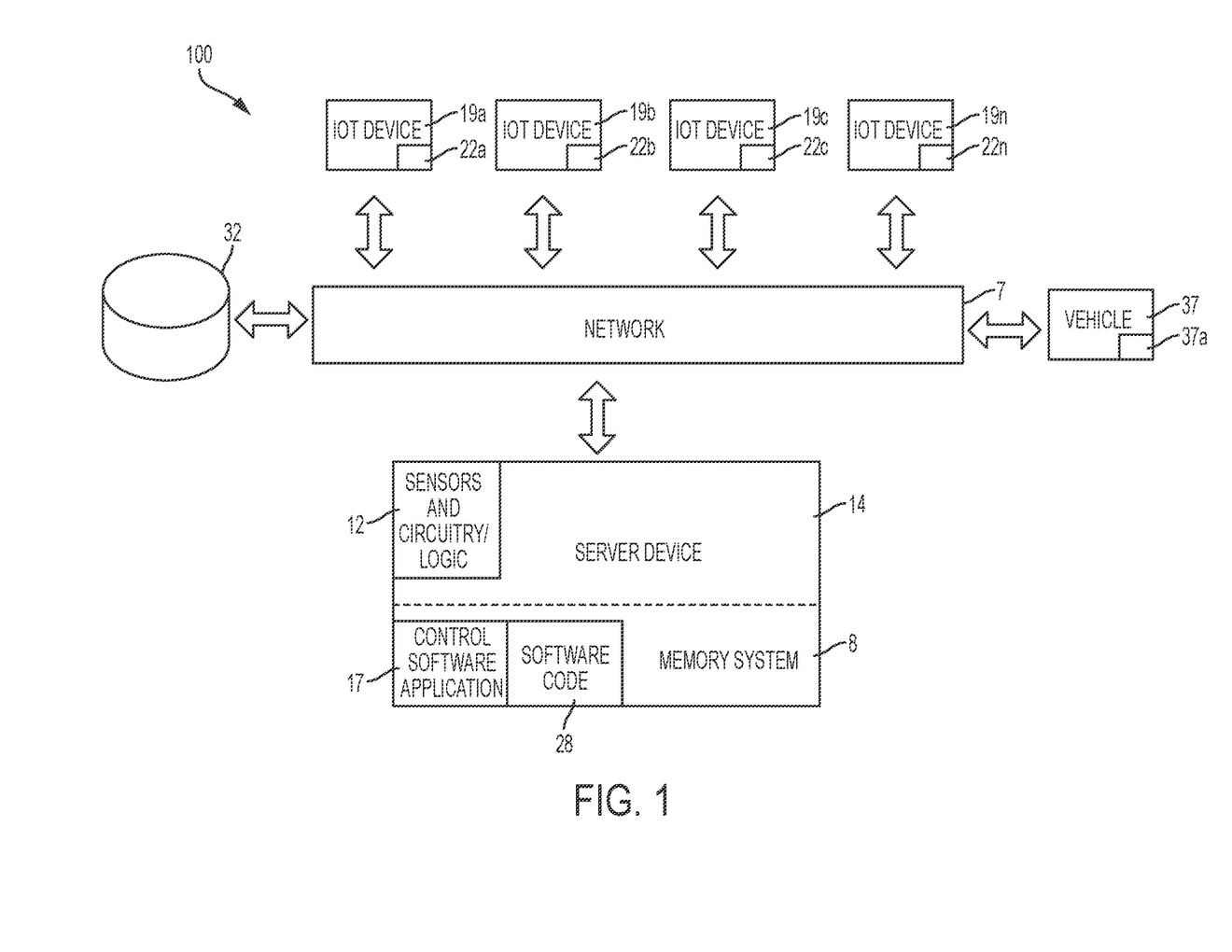
FIG. 1 illustrates a system for improving hardware utilization technology associated with detecting Internet of Things (IOT) utilization attributes and executing a process for replacing an IOT device based on the detected utilization attributes, in accordance with embodiments of the present invention.

FIG. 1 illustrates a system 100 for improving hardware utilization technology associated with detecting Internet of Things (IOT) utilization attributes and executing a process for replacing an IOT device based on the detected utilization attributes, in accordance with embodiments of the present invention. System 100 detects an adequacy associated with a user's IOT devices and generates recommendations for selling and replacing the current IOT devices. For example, if an IOT device is determined to be inadequate for his or her need (e.g., a capacity of the IOT device is too small), system 100 may locate an alternative user for purchase of the IOT devices. In response, system 100 generates and transmits an alert (to the initiating user) requesting an agreement for selling, auctioning, or trading the current IOT devices determined to be inadequate. If the user accepts the agreement, system 100 will upload associated pictures and specifications describing IOT devices e.g., capacity, power consumption, price expected, etc.). The associated pictures and specifications are uploaded to a server device for completing the transaction. System 100 enables a process for automatically detecting an inadequacy of an IOT device to prevent future damage to the IOT device based on factors such as overuse. The inadequate IOT device may be automatically listed (and automatically delivered via vehicle 37) for sale, trade or auction. Additionally, an appropriate replacement IOT device for the user may be located via a network search process.

System 100 may be implemented via specialized software generation or execution or via a specialized cloud based software system. Alternatively, system 100 may be implemented as a standalone hardware system running locally on a home area network. The specialized software system implements the following process for replacing an IOT device based on the detected utilization attributes:

The process is initiated when software is enabled for enrolling users associated with a home area network (HAN). When a user enrolls his or her HAN with the software, time series based usage from differing connected IOT devices (enrolled in the HAN) is detected and stored within a specialized memory repository. In response, system 100 determines usage attributes and analyzes (e.g., via proprietary IT systems) the usage attributes. Usage attributes may include, inter alia, how many times is an IOT device used within a given time frame, how many times has the IOT device malfunctioned, energy consumption, repair time, etc. The analyzed usage attributes comprising usage patterns are automatically compared to similar IOT device standard advisory usage patterns. Additionally, system 100 locates alternative IOT devices for providing replacement devices. The following examples describe possible usage indicating an inadequate capacity with respect to an IOT device:

1. An automatic robot vacuum cleaner (recommended for 8 hours per day usage) functions for 20 hours per day.
2. A refrigerator is filled to capacity 99% of the time.
3. A washing machine is used daily with 30% more than a recommended load.
4. A thermostat being modified 10 times per day.

System 100 may locate alternative IOT devices by automatically connecting to differing item sale or auction Websites for crawling through a user's demand for used IOT device purchasing. System 100 stores associated demand records in a repository to locate matching IOT devices for sale at respective auction Websites. When system 100 locates an IOT device matching a user demand, system 100 dispatches a notification to the IOT device's current owner/user for consent initialize an auction. In response to the notification, the IOT device may be automatically disabled (e.g., power is automatically shut down) and the user transmits specifications for the device (e.g., image, details, claimed price, etc.) to a server for broadcast with respect to differing auction Websites.

System 100 of FIG. 1 includes IoT devices 19a . . . 19n, a vehicle 37, and a database system 32 connected through an IoT network 7 to a server device 14. Server device 14 comprises sensors and circuitry/logic 12 and a (specialized) memory system 8. Memory system 8 comprises a control software application 17 and software code 28. Memory system 8 may include a single memory system. Alternatively, memory system 8 may include a plurality of memory systems. IoT devices 19a . . . 19n comprise hardware/software resources and sensors 22a . . . 22n, respectively. IoT devices 19a . . . 19n, database system 32, and server device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, IoT devices 19a . . . 19n, database system 32, and server device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry (e.g., sensors and circuitry/logic 12, hardware/software resources and sensors 22a . . . 22n, etc.) may include proprietary specially designed components (e.g., a specialized integrated circuit, such as for example an Application Specific Integrated Circuit (ASIC) designed for only implementing a process for improving hardware utilization technology associated with detecting Internet of Things (IOT) utilization attributes and executing a process for replacing an IOT device based on the detected utilization attributes. Sensors and circuitry/logic 12, hardware/software resources and sensors 22a . . . 22n may include, inter alia, light detection sensors, audio sensors; GPS sensors, optical sensors, temperature sensors, pressure sensors, voltage sensors, optical sensors, gas sensors, proximity sensors, vibration sensors, motion sensors, laser sensors, water sensors, fingerprint sensors, heart rate sensors, solar sensors, NFC sensors, RFID sensors, Infrared sensors, an accelerometer sensor, etc. Likewise, resources of hardware/software resources and sensors 22a . . . 22n may include, inter alia, Bluetooth resources, Wi-Fi resources, 3G/4G resources, digital storage resources, facial recognition resources, voice recognition resources, camera resources, power resources, etc. Vehicle 37 (comprising audio, video, and optical sensors 37a) may comprise any vehicle that does not require a human operator to be located within the vehicle 37 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 37 to know it's location and self-determine a route for executing an IOT device exchange), a pre-programmed vehicle, etc. Alternatively, vehicle 37 may comprise any type of vehicle that includes a human operator located within the vehicle (e.g., an aircraft, an automobile, a boat or ship, a train, etc.). Vehicle 37 may include, inter alia, an aerial vehicle, a land based vehicle, a marine (water) based vehicle, etc. IoT network 7 may include any type of network including, inter alia, a local area network (LAN), a wide area network (WAN), the Internet, a wireless network, etc.

Figure 2:
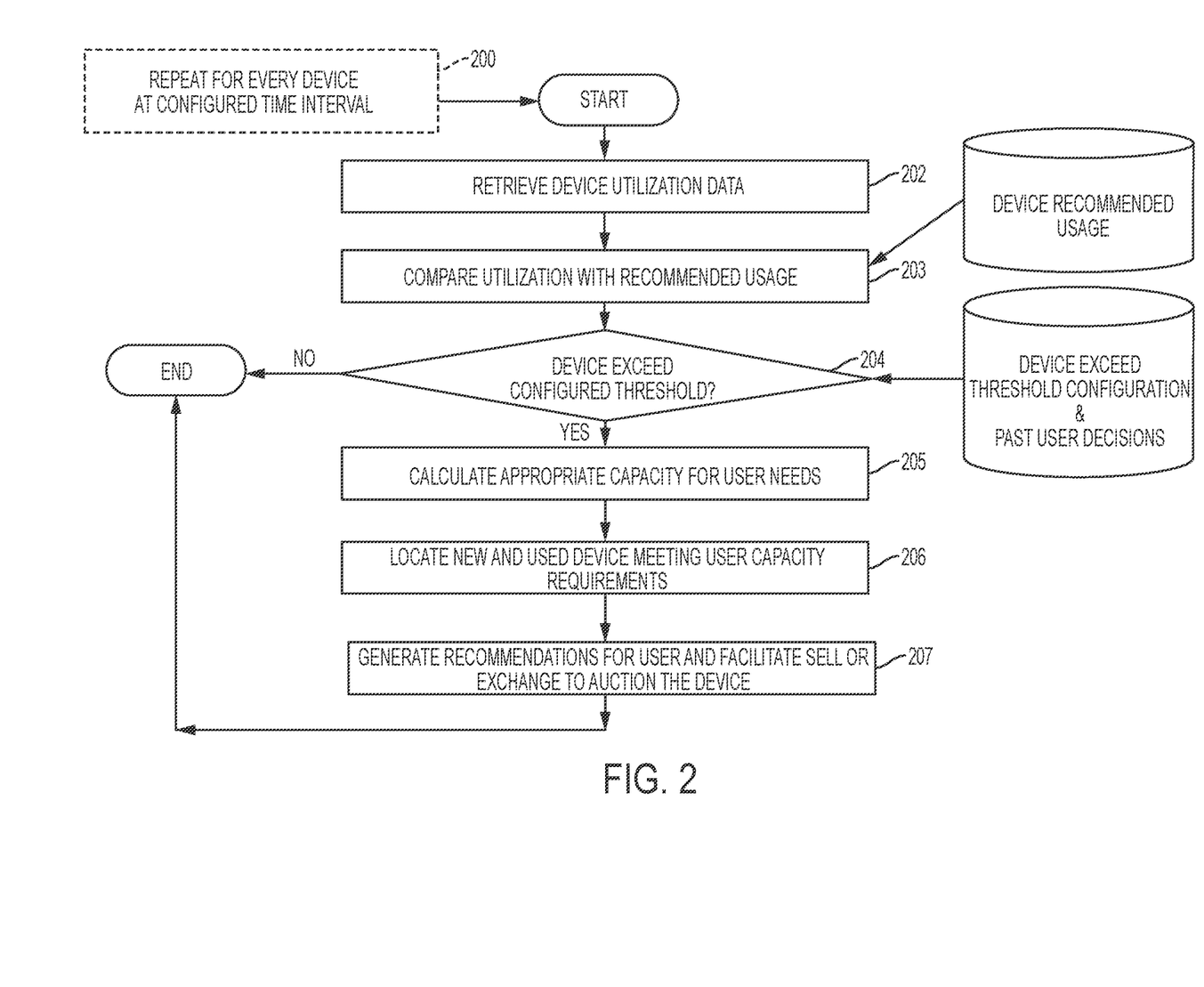
FIG. 2 illustrates an algorithm detailing for replacing an IOT device based on the detected utilization attributes enabled by system 100 of FIG. 1, in accordance with embodiments of the present invention.

FIG. 2 illustrates an algorithm detailing a process for replacing an IOT device based on detected utilization attributes enabled by system 100 of FIG. 1, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server device 14 and IoT devices 19a . . . 19n of FIG. 1. Step 200 indicates that the system proceeds at specified time intervals for each IOT device to determine if a current IOT device is sufficient to meet user needs. The specified time intervals may vary for each type of IOT device and are configurable. In step 202, device utilization data is accessed for the IOT devices. In step 203, an over usage threshold is defined for each of the IOT devices. Additionally, a device recommended usage is compared to the device utilization data. For example, with respect to first specified IOT devices, a recommended usage may be accessed via a Website. Alternatively, with respect to second specified IOT devices, a recommended usage may be determined via detected utilization attributes. For example, a refrigerator owned by a user determined to be at full capacity more than 5 days of the week is defined as over utilization. In step 204, it is determined if the current IOT device utilization rate exceeds the over usage threshold. If the current IOT device utilization rate exceeds the over usage threshold then in step 205, an associated user capacity is calculated based on current and forecasted usage of the current IOT device. In step 206, a search (via a Website) for a replacement IOT device is initiated. The replacement IOT device may meet or exceed a required capacity. The user is presented with results of the search. In step 207, recommendations for the user to exchange, sell, or auction the current IOT device are presented to the user and the system retrieves details associated with the current IOT. The details may include, inter alia, a price range, photos, special conditions, a make, a model, power consumption specifications, etc.

Figure 3:
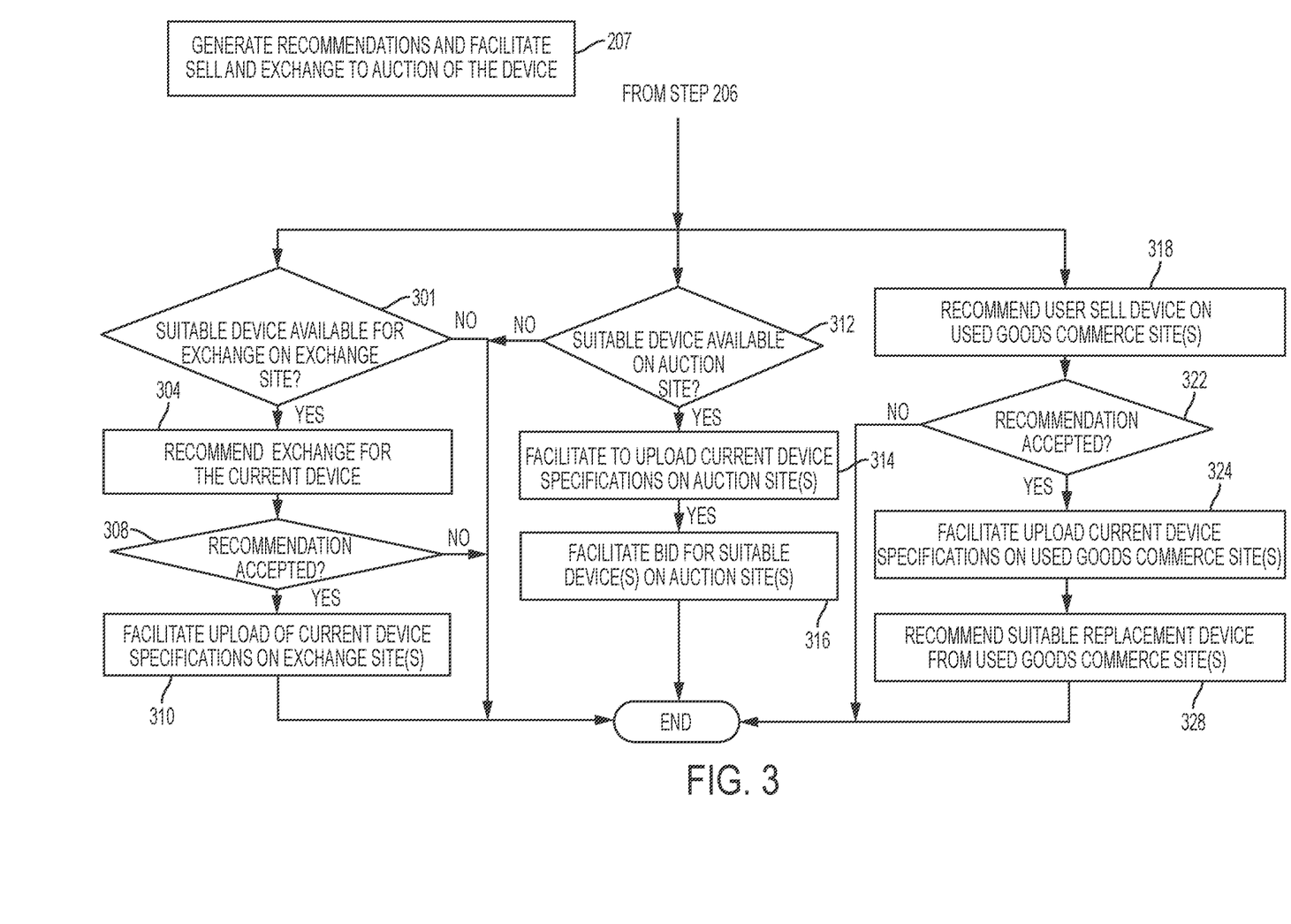
FIG. 3 illustrates an algorithm detailing a recommendation step of the algorithm of FIG. 2 enabled, in accordance with embodiments of the present invention.

FIG. 3 illustrates an algorithm detailing step 207 of FIG. 2 for generating and implementing IOT device recommendations, in accordance with embodiments of the present invention. Steps 301-310 execute an IOT device exchange process. In step 301, it is determined that a suitable replacement IOT device is available for exchange (with an original IOT device). In step 304, the system executes a Web search with respect to device exchange Websites to determine and recommend a suitable device for exchange. If the recommendation is accepted in step 308, then in step 310, an exchange process is initiated by uploading device details to the exchange Website. Steps 312-316 execute an IOT device auction process. In step 312, it is determined that a suitable replacement IOT device is available for auction. In step 314, IOT device details and specifications are uploaded to an auction Website. In step 316, an auction bid for the suitable replacement IOT device is automatically placed. Steps 318-328 execute an IOT device sales process. In step 318, a recommendation for selling an original IOT device is generated and presented to the user. In step 322, the recommendation is accepted (by the user) and in step 324, IOT device details and specifications are uploaded to an ecommerce Website. In step 328, a recommendation for purchasing a replacement IOT device is generated and presented to the user.

Figure 4:
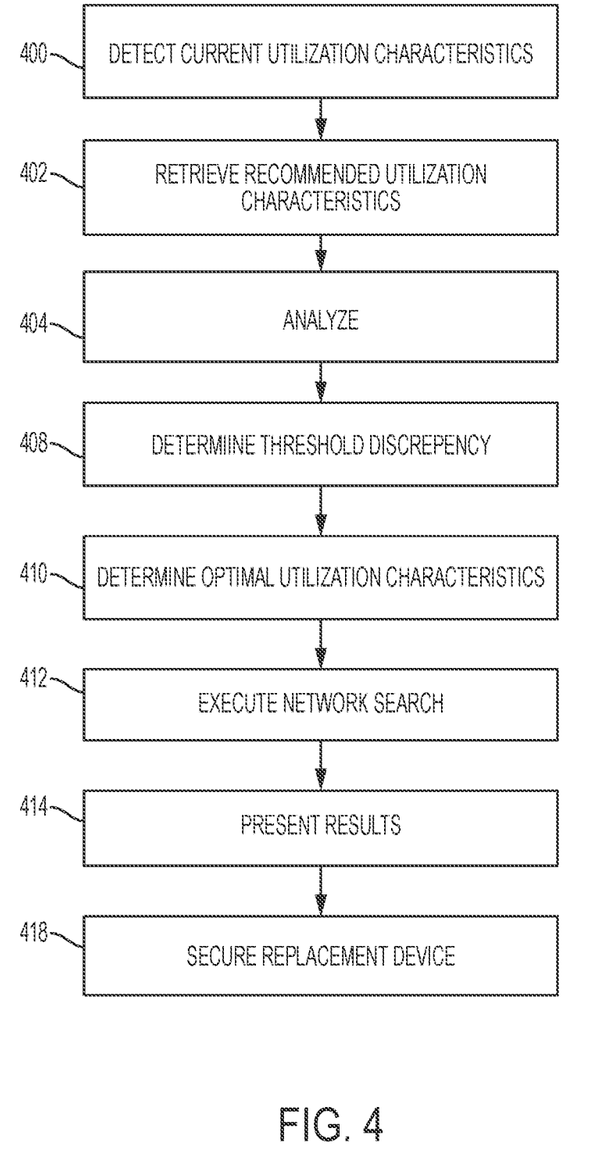
FIG. 4 illustrates an algorithm detailing a process enabled by the system of FIG. 1 for improving hardware utilization technology associated with detecting Internet of Things (IOT) utilization attributes and executing a process for replacing an IOT device based on the detected utilization attributes, in accordance with embodiments of the present invention.

FIG. 4 illustrates an algorithm detailing a process enabled by system 100 of FIG. 1 for improving hardware utilization technology associated with detecting Internet of Things (IOT) utilization attributes and executing a process for replacing an IOT device based on the detected utilization attributes, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by server device 14 and IoT devices 19a . . . 19n of FIG. 1. In step 400, current utilization characteristics of an IOT device (connected to a server device through a network) are detected (e.g., via execution of specialized software code retrieving the current utilization characteristics from a database). The current utilization characteristics may be detected by monitoring the IOT device via a plurality of sensors and retrieving the current utilization characteristics from the plurality of sensors. The current utilization characteristics may include of voltage levels, current levels, temperature levels, capacity levels, pressure levels, etc. Alternatively, the current utilization characteristics may be detected by monitoring a performance level of the IOT device and determining the current utilization characteristics from the performance level of the IOT device. As a second alternative, the current utilization characteristics may be detected by execution of a pinging process or publishing process.

In step 402, recommended utilization characteristics of the IOT device are retrieved form a database. In step 404, the current utilization characteristics are analyzed with respect to the recommended utilization characteristics. In step 408, it is determined that the current utilization characteristics do not equal (e.g., exceed or are less than) a threshold value associated with the recommended utilization characteristics. In step 410, optimal utilization characteristics for replacing the IOT device are determined based on results of step 408. In step 412, a network based search for locating a replacement IOT device is executed. In step 414, results of the network based search are presented to the user via a GUI. In step 418, a process for securing the replacement device is executed. The process for securing the replacement device may include:

1. Determining that the replacement IOT device is currently available on an exchange based Website.
2. Presenting a recommendation (to the user via a GUI) for exchanging the IOT device with a replacement IOT device.
3. Determining that the recommendation has been accepted by the user.
4. Uploading operating and capacity specifications for the IOT device to the auction based Website.
5. Transferring possession of the IOT device from the user to a facility associated with the exchange based Website. For example, the transfer may be implemented via control of an autonomous vehicle for automatically retrieving the IOT for the user and delivering to the facility.

6. Transferring possession (via control of an autonomous vehicle as described, supra) of the replacement IOT device from the facility associated with the exchange based Website to said user.

Alternatively, the process for securing the replacement device may include:
1. Determining that the replacement IOT device is currently available on an auction based Website.
2. Uploading operating and capacity specifications for the IOT device to the auction based Website.
3. Automatically placing a bid (via the auction based Website) for the replacement IOT device.
4. Determining that the bid has been accepted.
5. Transferring possession of the IOT device from the user to a facility associated with the auction based Website.
6. Transferring possession of the replacement IOT device from the facility associated with the auction based Website to the user.

As a second alternative, the process for securing the replacement device may include:
1. Presenting a recommendation for selling the IOT device through a specified Website.
2. Determining that the user has accepted the recommendation.
3. Uploading operating and capacity specifications for the IOT device to the specified Website.
3. Presenting a Webpage associated with the replacement IOT device.
4. Receiving (from a user via the Webpage) authorization for securing the replacement IOT device.
5. Transferring possession of the IOT device from the user to a facility associated with the specified Website.
6. Transferring possession of the replacement IOT device from the facility associated with the specified Website to the user.

Figure 5:
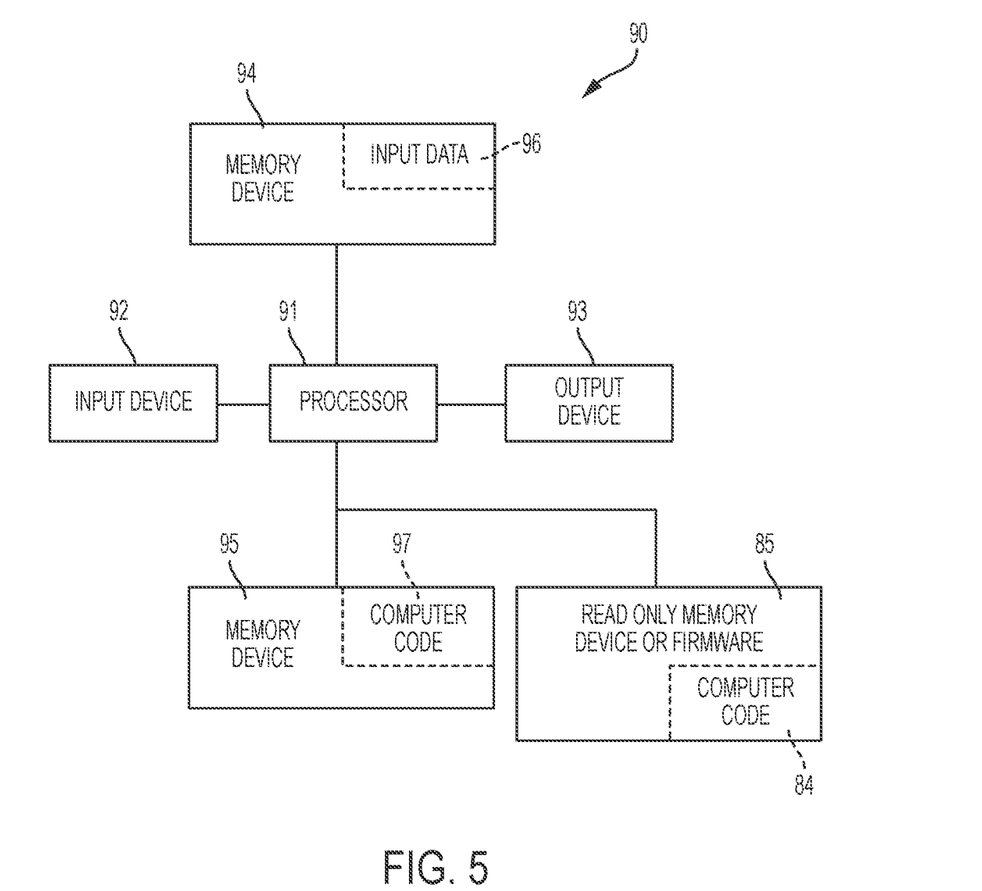
FIG. 5 illustrates a computer system used by or comprised by the system of FIG. 1 for improving hardware utilization technology associated with detecting Internet of Things (IOT) utilization attributes and executing a process for replacing an IOT device based on the detected utilization attributes, in accordance with embodiments of the present invention.

FIG. 5 illustrates a computer system 90 (e.g., server device 14 and IoT devices 19a . . . 19n of FIG. 1) used by or comprised by the system of FIG. 1 for improving hardware utilization technology associated with detecting Internet of Things (IOT) utilization attributes and executing a process for replacing an IOT device based on the detected utilization attributes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for improving hardware utilization technology associated with detecting IOT utilization attributes and executing a process for replacing an IOT device based on the detected utilization attributes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2-4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware utilization technology associated with detecting IOT utilization attributes and executing a process for replacing an IOT device based on the detected utilization attributes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware utilization technology associated with detecting IOT utilization attributes and executing a process for replacing an IOT device based on the detected utilization attributes. In another embodiment, the invention provides a business method that performs the process steps of the invention on a subscription, advertising, and/or fee basis. That is, a service supplier, such as a Solution Integrator, could offer to enable a process for improving hardware utilization technology associated with detecting IOT utilization attributes and executing a process for replacing an IOT device based on the detected utilization attributes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
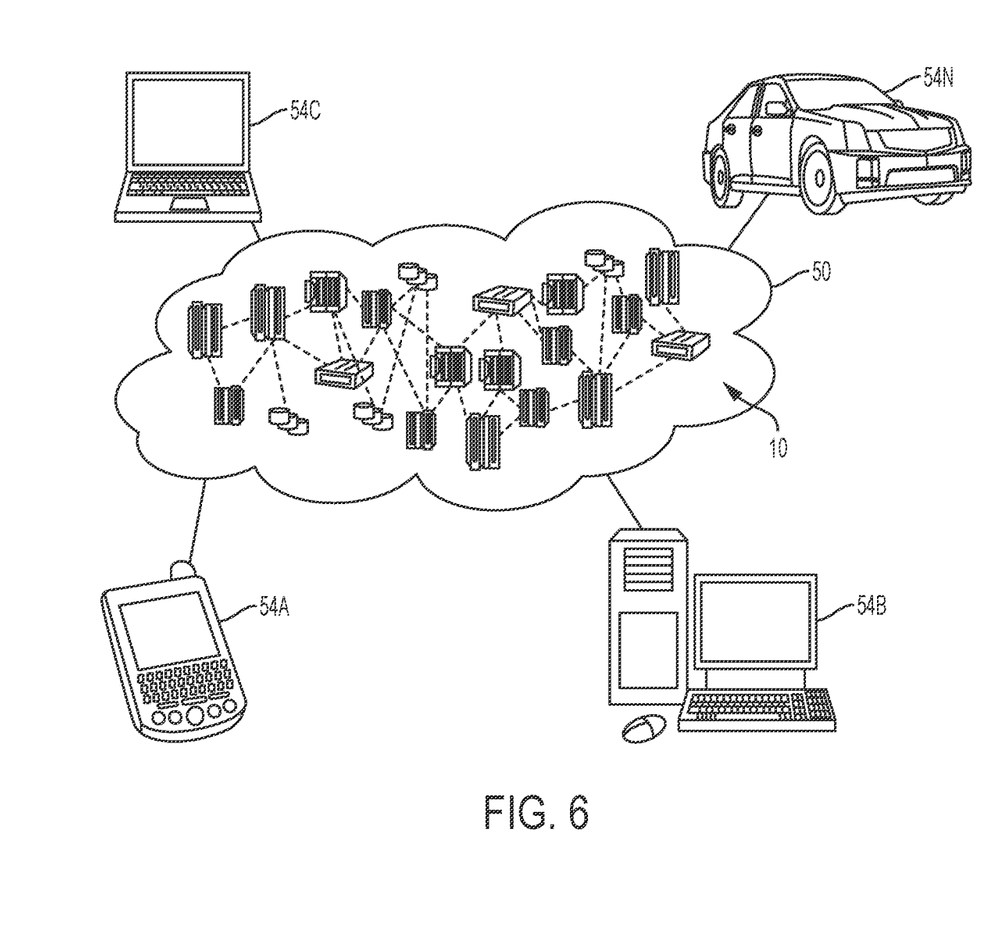
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
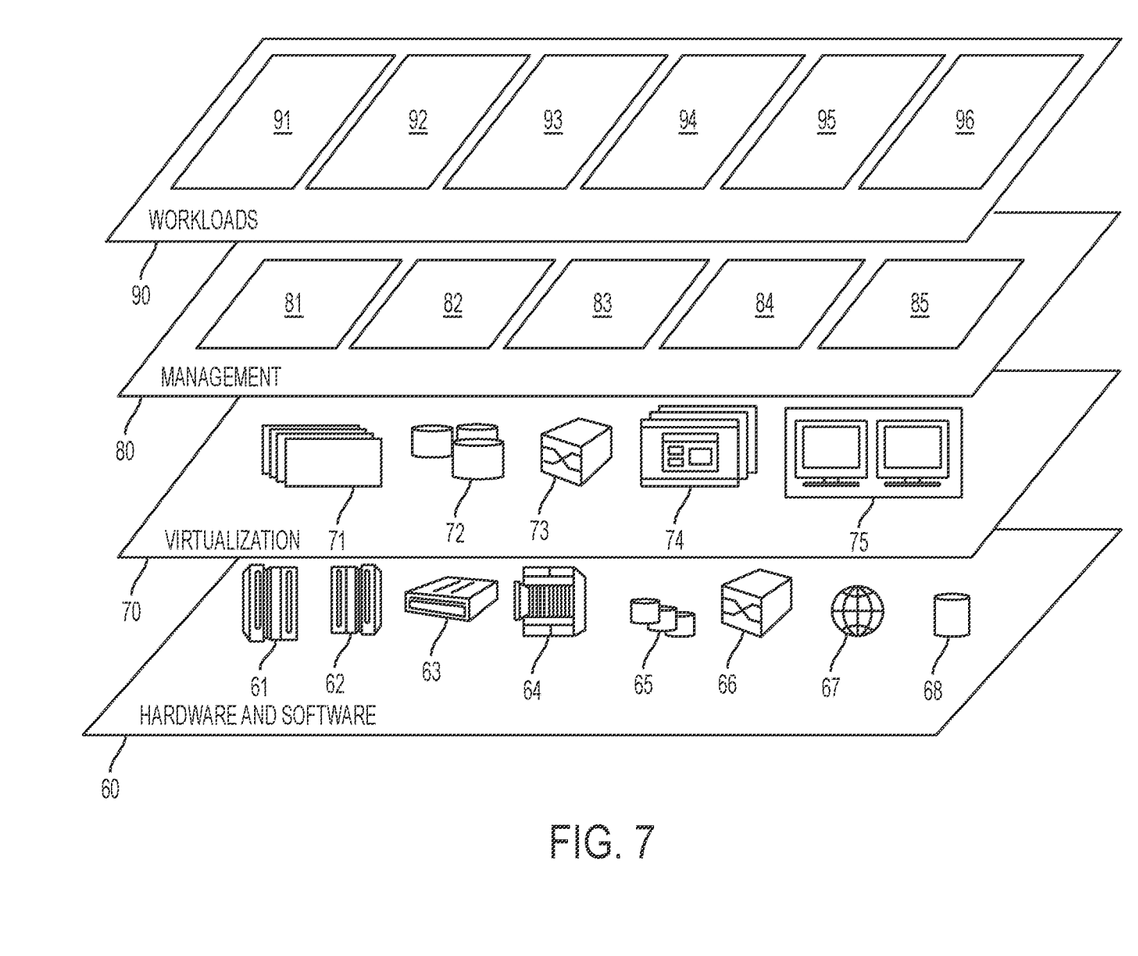
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving hardware utilization technology associated with detecting IOT utilization attributes and executing a process for replacing an IOT device based on the detected utilization attributes 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A device replacement improvement method comprising:
    detecting, by a processor of a server device via voltage, optical, temperature, pressure, and vibration detection sensors, current utilization characteristics of an Internet of things (IOT) device connected to said server device through a network, wherein said current utilization characteristics are associated with a number of times that said IOT device is used within a given time frame, a number of times that said IOT device has malfunctioned, an energy consumption of said IOT device, and a previous repair time for repairs to said IOT device;
    retrieving from a first database, by said processor, recommended utilization characteristics of said IOT device, wherein said current utilization characteristics and said recommended utilization characteristics comprise time based characteristics, capacity characteristics, usage percentage characteristics, and settings modification characteristics;
    analyzing, by said processor, said current utilization characteristics with respect to said recommended utilization characteristics;
    determining, by said processor based on results of said analyzing, that said current utilization characteristics do not equal a threshold value associated with said recommended utilization characteristics;
    additionally detecting, by said processor via said voltage, optical, temperature, pressure, and vibration detection sensors in response to said determining that said current utilization characteristics do not equal said threshold value, an inadequacy of said IOT device with respect to preventing future damage to said IOT device based on extended usage factors;
    determining in response to said additionally detecting and said determining that said current utilization characteristics do not equal said threshold value, by said processor based on analysis of said current utilization characteristics with respect to predicted utilization characteristics of said IOT device, optimal utilization characteristics for replacing said IOT device;
    executing, by said processor, a network based search for locating a replacement IOT device;
    presenting to a user, by said processor via a GUI, results of said network based search;
    dispatching, by said processor, a notification to said user for retrieving consent to initialize replacement of said IOT device;
    automatically disabling, by said processor via a voltage sensor of said voltage, optical, temperature, pressure, and vibration detection sensors in response to said notification, said IOT device such that power for said IOT device is shut down;
    executing, by said processor in response to said dispatching and said automatically disabling, a process for securing said replacement IOT device by enabling control of an autonomous vehicle thereby enabling automatic retrieval and placement of said replacement IOT device causing the user to retrieve the replacement IOT device; and
    uploading, by said processor, associated pictures and specifications describing said IOT device, wherein said specifications describe capacity and power consumption attributes of said IOT device.

2. The method of claim 1, wherein said process for securing said replacement IOT device comprises:
    determining that said replacement IOT device is currently available on an exchange based Website;
    presenting to said user via said GUI a recommendation for exchanging said IOT device with said replacement IOT device;
    determining that said recommendation has been accepted by said user;
    uploading operating and capacity specifications for said IOT device to said exchange based Website;
    transferring possession, via said autonomous vehicle, of said IOT device from said user to a facility associated with said exchange based Website; and
    transferring possession, via said autonomous vehicle, of said replacement IOT device from said facility associated with said exchange based Website to said user.

3. The method of claim 1, wherein said process for securing said replacement IOT device comprises:
    determining that said replacement IOT device is currently available on an auction based Website;
    uploading operating and capacity specifications for said IOT device to said auction based Website;
    automatically placing a bid, via said auction based Website, for said replacement IOT device;
    determining that said bid has been accepted;
    transferring possession, via said autonomous vehicle, of said IOT device from said user to a facility associated with said auction based Website; and
    transferring possession, via said autonomous vehicle, of said replacement IOT device from said facility associated with said auction based Website to said user.

4. The method of claim 1, wherein said process for securing said replacement IOT device comprises:
presenting to said user, via said GUI, a recommendation for selling said IOT device through a specified Website;
determining that said user has accepted said recommendation;
uploading operating and capacity specifications for said IOT device to said specified Website;
presenting to said user via said GUI, a Webpage associated with said replacement IOT device;
receiving from said user, via said Webpage, authorization for said securing said replacement IOT device
transferring possession, via said autonomous vehicle, of said IOT device from said user to a facility associated with said specified Website; and
transferring possession, via said autonomous vehicle, of said replacement IOT device from said facility associated with said specified Website to said user.

5. The method of claim 1, wherein said detecting said current utilization characteristics of said IOT device comprises:
monitoring said IOT device via a plurality of sensors; and
retrieving said current utilization characteristics from said plurality of sensors.

6. The method of claim 5, wherein said utilization characteristics comprise characteristics selected from a group consisting of voltage levels, current levels, temperature levels, capacity levels, and pressure levels.

7. The method of claim 1, wherein said detecting said current utilization characteristics of said IOT device comprises:
retrieving said current utilization characteristics from a database.

8. The method of claim 1, wherein said detecting said current utilization characteristics of said IOT device comprises:
monitoring a performance level of said IOT device; and
determining said current utilization characteristics from said performance level of said IOT device.

9. The method of claim 1, further comprising:
executing, by said processor, software code for automatically executing said detecting said current utilization characteristics of said IOT device.

10. The method of claim 1, wherein said detecting said current utilization characteristics of said IOT device comprises:
pinging said IOT device; and
receiving a response to said pinging.

11. The method of claim 1, wherein said detecting said current utilization characteristics of said IOT device comprises:
periodically publishing a message associated with a subscription, wherein said message indicates said current utilization characteristics over said network.

12. The method of claim 1, wherein said current utilization characteristics exceed said threshold value.

13. The method of claim 1, wherein said current utilization characteristics are less than said threshold value.

14. The method of claim 1, further comprising:
providing at least one support service for at least one of creating, integrating, hosting, maintaining, and deploying computer-readable code in the server device, said code being executed by the processor to implement: said detecting, said retrieving, said analyzing, said determining that said current utilization attributes do not equal said threshold value, said determining said optimal utilization attributes, said executing network based search, said presenting, and said executing said process.

15. A computer program product, comprising a computer readable hardware storage device storing a computer readable program code, said computer readable program code comprising an algorithm that when executed by a processor of a server device implements a device replacement improvement method, said method comprising:
detecting, by said processor via voltage, optical, temperature, pressure, and vibration detection sensors, current utilization characteristics of an Internet of things (IOT) device connected to said server device through a network, wherein said current utilization characteristics are associated with a number of times that said IOT device is used within a given time frame, a number of times that said IOT device has malfunctioned, an energy consumption of said IOT device, and a previous repair time for repairs to said IOT device;
retrieving from a first database, by said processor, recommended utilization characteristics of said IOT device, wherein said current utilization characteristics and said recommended utilization characteristics comprise time based characteristics, capacity characteristics, usage percentage characteristics, and settings modification characteristics;
analyzing, by said processor, said current utilization characteristics with respect to said recommended utilization characteristics;
determining, by said processor based on results of said analyzing, that said current utilization characteristics do not equal a threshold value associated with said recommended utilization characteristics;
additionally detecting, by said processor via said voltage, optical, temperature, pressure, and vibration detection sensors in response to said determining that said current utilization characteristics do not equal said threshold value, an inadequacy of said IOT device with respect to preventing future damage to said IOT device based on extended usage factors;
determining in response to said additionally detecting and said determining that said current utilization characteristics do not equal said threshold value, by said processor based on analysis of said current utilization characteristics with respect to predicted utilization characteristics of said IOT device, optimal utilization characteristics for replacing said IOT device;
executing, by said processor, a network based search for locating a replacement IOT device;
presenting to a user, by said processor via a GUI, results of said network based search;
dispatching, by said processor, a notification to said user for retrieving consent to initialize replacement of said IOT device;
automatically disabling, by said processor via a voltage sensor of said voltage, optical, temperature, pressure, and vibration detection sensors in response to said notification, said IOT device such that power for said IOT device is shut down;
executing, by said processor in response to said dispatching and said automatically disabling, a process for securing said replacement IOT device by enabling control of an autonomous vehicle thereby enabling automatic retrieval and placement of said replacement IOT device causing the user to retrieve the replacement IOT device; and uploading, by said processor, associated pictures and specifications describing said IOT device, wherein said specifications describe capacity and power consumption attributes of said IOT device.

16. The computer program product of claim 15, wherein said process for securing said replacement IOT device comprises:
   determining that said replacement IOT device is currently available on an exchange based Website;
   presenting to said user via said GUI a recommendation for exchanging said IOT device with said replacement IOT device;
   determining that said recommendation has been accepted by said user;
   uploading operating and capacity specifications for said IOT device to said exchange based Website;
   transferring possession, via said autonomous vehicle, of said IOT device from said user to a facility associated with said exchange based Website; and
   transferring possession, via said autonomous vehicle, of said replacement IOT device from said facility associated with said exchange based Website to said user.

17. The computer program product of claim 15, wherein said process for securing said replacement IOT device comprises:
   determining that said replacement IOT device is currently available on an auction based Website;
   uploading operating and capacity specifications for said IOT device to said auction based Website;
   automatically placing a bid, via said auction based Website, for said replacement IOT device;
   determining that said bid has been accepted;
   transferring possession, via said autonomous vehicle, of said IOT device from said user to a facility associated with said auction based Website; and
   transferring possession, via said autonomous vehicle, of said replacement IOT device from said facility associated with said auction based Website to said user.

18. The computer program product of claim 15, wherein said process for securing said replacement IOT device comprises:
   presenting to said user, via said GUI, a recommendation for selling said IOT device through a specified Website;
   determining that said user has accepted said recommendation;
   uploading operating and capacity specifications for said IOT device to said specified Website;
   presenting to said user via said GUI, a Webpage associated with said replacement IOT device;
   receiving from said user, via said Webpage, authorization for said securing said replacement IOT device
   transferring possession, via said autonomous vehicle, of said IOT device from said user to a facility associated with said specified Website; and
   transferring possession, via said autonomous vehicle, of said replacement IOT device from said facility associated with said specified Website to said user.

19. The computer program product of claim 15, wherein said detecting said current utilization attributes of said IOT device comprises:
   monitoring said IOT device via a plurality of sensors; and
   retrieving said current utilization characteristics from said plurality of sensors.

20. A server device comprising a processor coupled to a computer-readable memory unit, said memory unit comprising instructions that when executed by the processor executes a device replacement improvement method comprising:
   detecting, by said processor via voltage, optical, temperature, pressure, and vibration detection sensors, current utilization characteristics of an Internet of things (IOT) device connected to said server device through a network, wherein said current utilization characteristics are associated with a number of times that said IOT device is used within a given time frame, a number of times that said IOT device has malfunctioned, an energy consumption of said IOT device, and a previous repair time for repairs to said IOT device;
   retrieving from a first database, by said processor, recommended utilization characteristics of said IOT device, wherein said current utilization characteristics and said recommended utilization characteristics comprise time based characteristics, capacity characteristics, usage percentage characteristics, and settings modification characteristics;
   analyzing, by said processor, said current utilization characteristics with respect to said recommended utilization characteristics;
   determining, by said processor based on results of said analyzing, that said current utilization characteristics do not equal a threshold value associated with said recommended utilization characteristics;
   additionally detecting, by said processor via said voltage, optical, temperature, pressure, and vibration detection sensors in response to said determining that said current utilization characteristics do not equal said threshold value, an inadequacy of said IOT device with respect to preventing future damage to said IOT device based on extended usage factors;
   determining in response to said additionally detecting and said determining that said current utilization characteristics do not equal said threshold value, by said processor based on analysis of said current utilization characteristics with respect to predicted utilization characteristics of said IOT device, optimal utilization characteristics for replacing said IOT device;
   executing, by said processor, a network based search for locating a replacement IOT device;
   presenting to a user, by said processor via a GUI, results of said network based search;
   dispatching, by said processor, a notification to said user for retrieving consent to initialize replacement of said IOT device;
   automatically disabling, by said processor via a voltage sensor of said voltage, optical, temperature, pressure, and vibration detection sensors in response to said notification, said IOT device such that power for said IOT device is shut down;
   executing, by said processor in response to said dispatching and said automatically disabling, a process for securing said replacement IOT device by enabling control of an autonomous vehicle thereby enabling automatic retrieval and placement of said replacement IOT device causing the user to retrieve the replacement IOT device; and
   uploading, by said processor, associated pictures and specifications describing said IOT device, wherein said specifications describe capacity and power consumption attributes of said IOT device.

\* \* \* \* \*